Patented Mar. 14, 1950

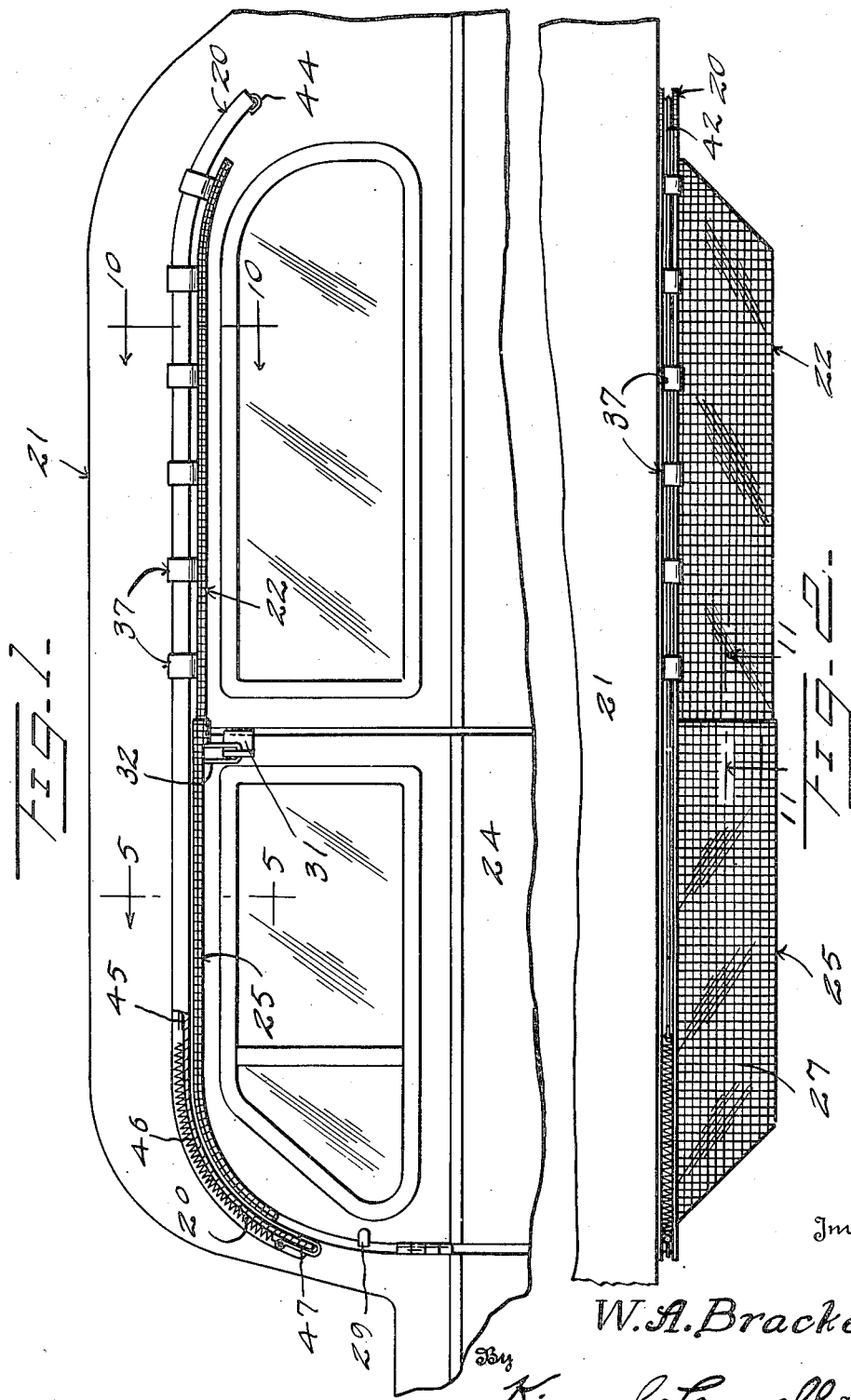

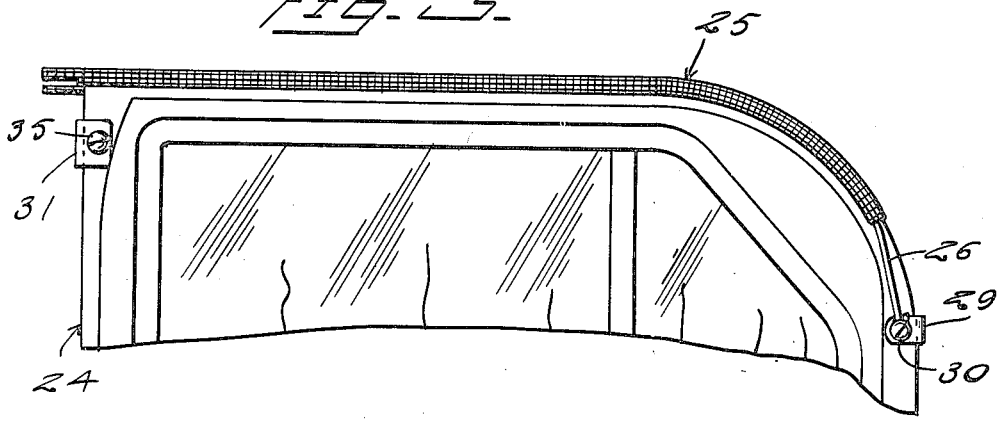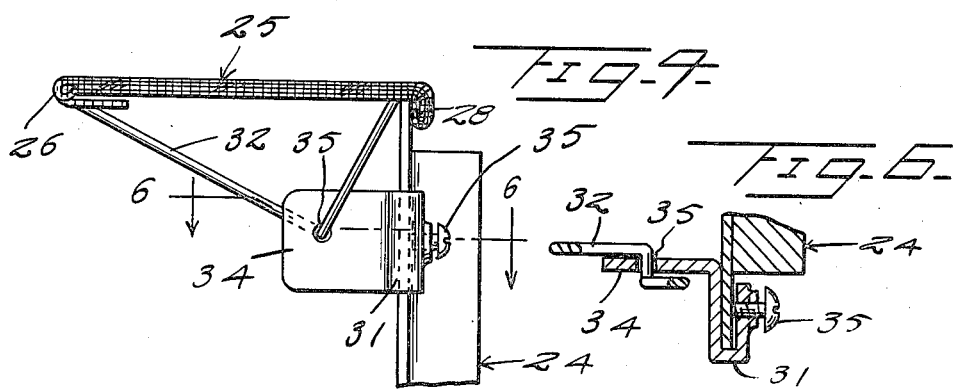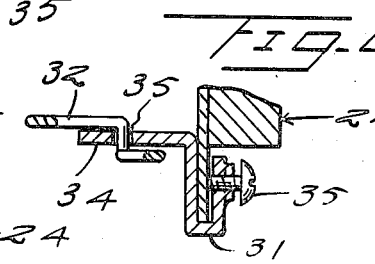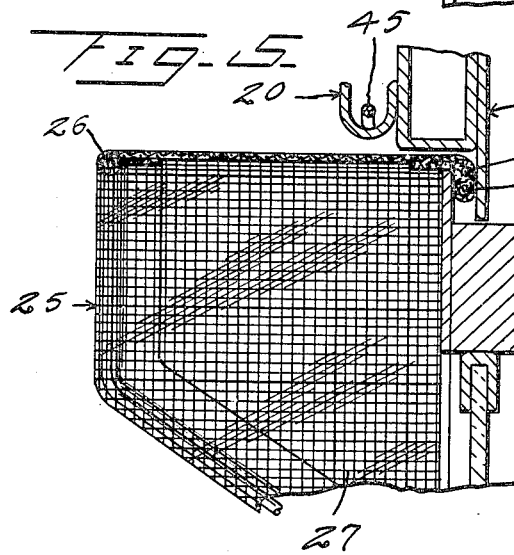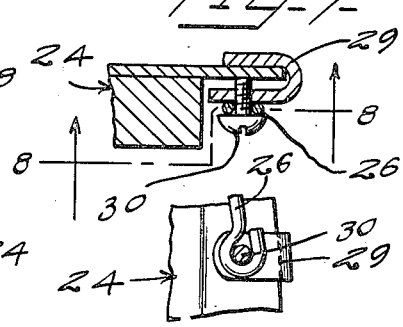

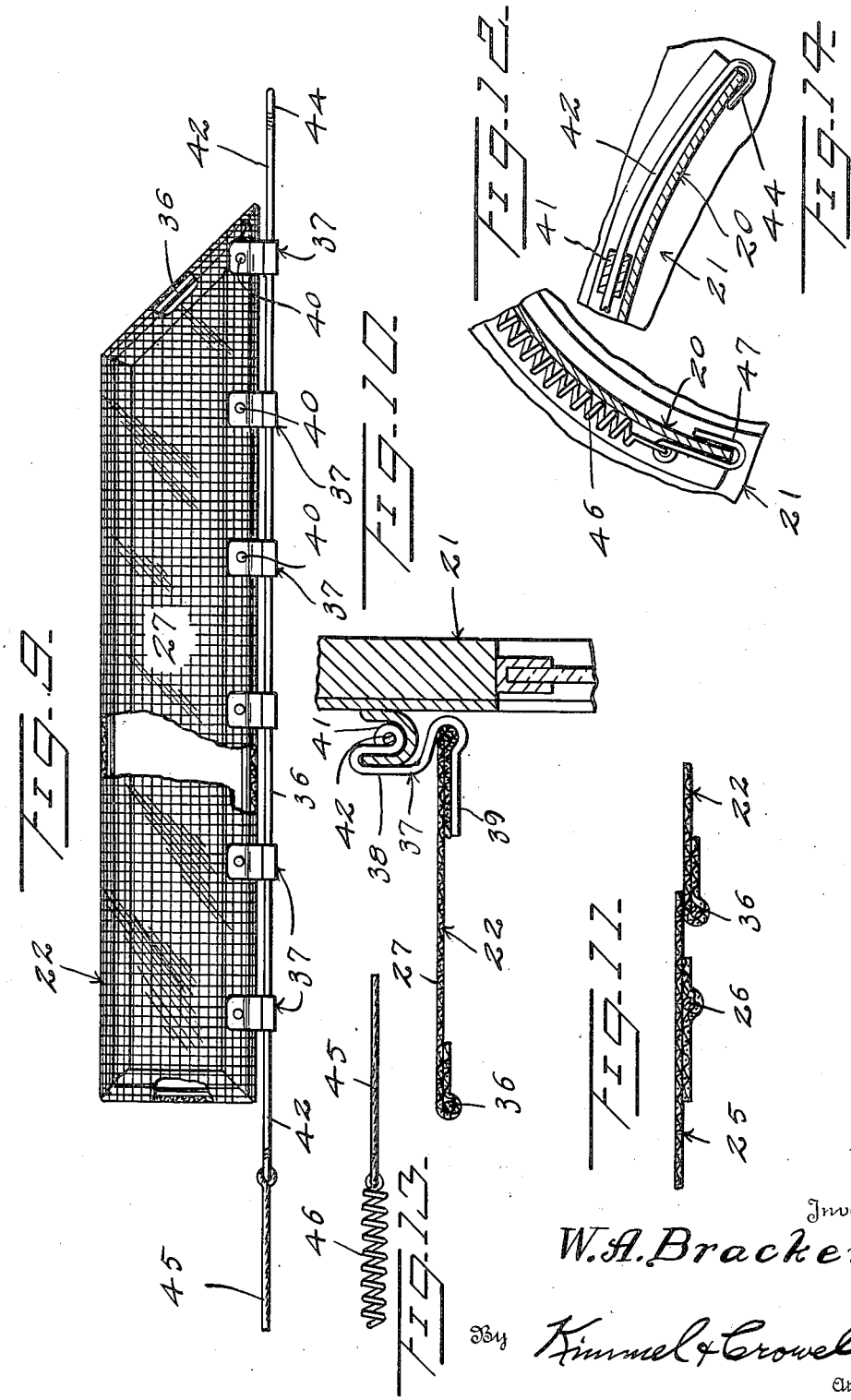

2,500,272

UNITED STATES PATENT OFFICE 2,500,272

AUTOMOBILE WINDOW AWNING

William A. Bracken, Levy, Ark.

Application June 12, 1946, Serial No. 676,132

5 Claims. (Cl. 160—54)

This invention relates to improvements in automobile window awnings, and more particularly to improved means for attaching window awnings to an automobile.

An object of this invention is to provide a set of automobile window awnings which may be secured to an automobile without drilling holes in the car and without marring the finish by clamping the awnings to the drip gutter above the windows in certain instances and by clamping the awnings to the edge of the door of the car.

Another object of this invention is to provide awnings for attachment to an automobile which may extend the full length of the windows and provide awnings for the doors of the car which may be fastened thereto so as to move outwardly with the door and which in the closed position of the door will assist in the support of the end of the awnings fixed to the body of the car.

Still another object of this invention is to provide an awning fixed to the door of a car which will partially overlap the rear awning mounted on the body of the car in such manner that the force of the wind will not pull the rear awning from the car.

A further object of this invention is to provide an awning for an automobile which may be readily attached to the car by any person, the attachment requiring practically no mechanical knowledge or skill and requiring only a screwdriver for attaching or removing the awning from the car.

With the above and other objects in view, my invention consists in the arrangement, combination and details of construction disclosed in the drawings and specification, and then more particularly pointed out in the appended claims.

Referring to the drawings,

Wherein similar reference characters designate similar parts throughout the respective views, Figure 1 is an outside elevation, partly broken away and partly in section, of the awnings of my invention attached to an automobile, Figure 2 is a top plan view of the awning in Figure 1, Figure 3 is an inside elevation, broken away, of the awning attached to a front door of the car, Figure 4 is an end view of the awning in Figure 3, Figure 5 is a vertical section, partly broken away, taken on the line 5—5 of Figure 1, Figure 6 is a horizontal section taken on the line 6—6 of Figure 5, Figure 7 is a detailed section, partly broken away, of the front clamp in Figure 3, Figure 8 is a section taken on the line 8—8 of Figure 7, Figure 9 is a bottom plan view of the rear awning and attaching parts, Figure 10 is a vertical section of the awning in Figure 9 as attached to the drip gutter of a car, Figure 11 is a horizontal detail section taken on the line 11—11 of Figure 2, Figure 12 is a detailed elevation, broken away and partly in section, of the front attaching spring for the rear awning, Figure 13 is a detailed plan view of the spring attached to the cable of the attaching cable for the rear awning, Figure 14 is a detailed elevation, partly in section, of the rear attaching hook for the rear awning.

Referring to the drawings, the numeral 20 designates generally the drip gutter of an automobile 21 to which the rear awning 22, constructed according to an embodiment of this invention, is adopted to engage, and the numeral 24 designates generally the front door upon which the front awning 25 is to be clamped.

Heretofore various types of awnings have been used on automobiles, none of which were generally acceptable because of the disadvantages of each type. Certain types were attached to the individual windows but possessed the disadvantage of limiting the view from the window. Others extended the length of all the windows but in order to permit space for swinging the doors on the car, the awnings became less effective. By using the awnings constructed according to this invention, the advantages of the former types are utilized and the disadvantages of those types do not exist.

The front awning 25, to be attached to the front door of a car, is formed with a metal wire frame 26, the elongated inner side of which is bent downwardly at right angles to the plane of the main portion of the frame, so that the frame 26 when covered with a painted screen 27 or fabric or other suitable covering material, forms a front awning 25 having a downwardly flanged inner edge 28 engageable between the door 24 and the door frame. The awning 25 is formed to fit the contour of the upper edge of the door 24 and extends forwardly and downwardly to shade the upper forward corner of the front window.

The flange 28 is adapted to be engaged over the upper edge of the door 24 and the wire frame 26 within the flange 28 extends forwardly of the awning 25 where it is attached to the door 24 by a U-shaped clamp 29. The clamp 29 engages over the forward edge of the door 24 and the wire 26 is engaged about the clamping screw 30 carried by the clamp 29, the screw engaging the inside of the edge of the door 24 to be concealed thereby. The rear end of the front awning 25 is supported by a clamp 31 and supporting member 32. Clamp 31 is formed of a U-shaped body having an apertured outwardly extending ear 34 and a clamp screw 35 to engage the inner side of the door 34. The V-shaped supporting member 32 is formed of a length of heavy wire or other suitable material the ends of which are fastened to the inner and outer edges of the frame 26 and engage in the opening 35 of the ear 34. The covering 27 of the front awning 25 extends beyond the rear end of the frame 26 and is adapted to overlap the front edge of the rear awning 22.

The rear awning 22 is also formed with a wire frame 36 covered with a painted screen 27 or other suitable material, but the elongated edges are coplanar as differentiated from the flanged edge of the front awning. The awning 22 is fitted to the contour of the rear portion of the drip gutter 20 and terminates a short distance ahead of the rear end of the gutter 20. The rear awning 22 is supported from the gutter 20 by a plurality of supporting members 37 which engage in the gutter 20. The members 37 are generally L shaped, having the upper vertical arm 38 reverted on the side opposite from the lower arm 39. The lower horizontal arm 39 is fixed to the awning 22 by rivets 40 or other suitable fastening devices, and the end of the reverted arm 38 is formed into a loop 41 within the gutter 20.

To fasten the rear awning to the gutter 20, when the loops 41 are placed in the gutter 20, there is provided a relatively rigid wire rod 42 which extends through the loops 41. The rear end of the rod 42 is formed into a hook 44 engageable over the lower rear end of the gutter 20. The rod 42 extends through all of the loops 41 and terminates shortly ahead of the front end of the rear awning 22, where it is attached to a cable or suitable flexible member 45 which extends forwardly in the gutter 20 to be fastened to a spring 46, or other suitable elastic member which in turn terminates in a front hook 47 engageable over the lower edge of the front end of the gutter 20.

The front awning 25 and clamps 29 and 31 are connected to be removed as a unit, and the rear awning 22, together with the members 37, rod 42, cable 45 and spring 46 are connected as a unit, so that for installing the awnings all the parts for each awning are connected together and are not likely to be lost.

For installing the front awning 25, the flange 28 is engaged over the upper edge of the door 24 so that the awning 25 will extend a short distance rearwardly beyond the door and the clamps 29 and 31 are tightened in place. The rear awning 22 is fastened on the automobile by pressing the loops 41 into the gutter 20 with the rod 42, cable 45 and spring 46. The hooks 44 and 47 are engaged over their respective ends of the gutter 20 and the awning 22 may be slid longitudinally along the rod 42 to the desired position. The front end of the awning 22 is adapted to be engaged under the rearwardly extending portion of the front awning so the front awning assists in supporting the rear awning and prevents the wind from blowing the front end of the rear awning up and the members 37 out of the gutter 20. The front end of the front awning 25 is curved downwardly as shown in Figure 1 of the drawings to provide a deflector so the wind is prevented from impinging on the front end of the rear awning 22 and the wind being deflected upwardly will tend to return on the upper surface of both awnings thus creating a force tending to secure the awnings in their fastenings.

With the use of this combination of awnings, a continuous awning for the windows of an automobile is provided, sufficiently close to the upper edge of the windows to be effective and yet, as the front awning is fixed to the door, the movement of the door is in no way impaired.

For awnings for use with a four-door automobile, the rear door awning may be supported by two such clamps and supporting members as clamp 31 and member 37 and the frame will be substantially the same as that of the front awning 25 with the flange 28 engageable over the upper edge of the door.

I do not mean to confine myself to the exact details of construction herein disclosed, but claim all variations falling within the purview of the appended claims.

Having thus described my invention, what I claim is:

1. An awning for the side windows of an automobile, said awning comprising a plurality of correlated sections, said sections including a body awning section supported from the drip gutter of the automobile and a door awning section secured to the edges of the door, said door section including a downwardly inclined front end and rearwardly extending portion engageable over the front end of said body section for supporting said front end against upward movement when the door and said door awning are in closed position.

2. In combination, a front awning carried by the front door of an automobile, a rear awning carried by said automobile rearwardly of said front awning, the front end of said front awning being inclined downwardly, the rear end of said front awning overlying the forward end of said rear awning whereby the front awning limits the upward deflection of said rear awning due to upwardly rising air forces acting on said awnings.

3. In combination, a front awning for an automobile having a drip gutter above the doors and windows and a rear awning for said automobile, means securing said front awning on a door of the automobile above the window, means dependingly supporting said rear awning from the drip gutter of said automobile, a downwardly and forwardly inclined front end on said front awning, the rear end of said front awning overlying the front end of the rear awning in the closed position of said door for securing the rear awning against upward deflection due to air forces acting on the awnings.

4. In combination, a front awning for an automobile having a drip gutter above the doors and windows and a rear awning for said automobile, a downwardly inclined front end on said front awning, means securing said front awning on a door of the automobile above the window, means dependingly supporting said rear awning from the drip gutter of said automobile, the rear end of said front awning overlying the front end of the rear awning in the closed position of said door for securing the rear awning against upward deflection due to air forces acting on the awnings.

5. In combination, a front awning for the side windows of a vehicle, a rear awning for the side of said vehicle, means securing said awnings to the side of said vehicle, a downwardly inclined front end on said front awning, the rear end of said front awning overlying the front end of said rear awning for supporting the front end of said rear awning against upward movement relative to said vehicle and said front awning.

WILLIAM A. BRACKEN.

REFERENCES CITED

The following references are of record in the file of this patent:

UNITED STATES PATENTS

| Number | Name | Date |
|---|---|---|
| 1,731,634 | McGrew | Oct. 15, 1929 |
| 2,034,342 | Hay | Mar. 17, 1936 |